US012591479B2

(12) United States Patent
Nalam et al.

(10) Patent No.: US 12,591,479 B2
(45) Date of Patent: Mar. 31, 2026

(54) DATA PROCESSING SYSTEM MANAGEMENT USING PREDICTIVE IMPLICATIONS OF USER ACTIONS

(71) Applicant: Dell Products L.P., Round Rock, TX (US)

(72) Inventors: Lakshmi Saroja Nalam, Bangalore (IN); Sirisha Karnam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/777,852

(22) Filed: Jul. 19, 2024

(65) Prior Publication Data

US 2026/0023636 A1      Jan. 22, 2026

(51) Int. Cl.
| | |
|---|---|
| *G06F 11/00* | (2006.01) |
| *G06F 11/07* | (2006.01) |
| *G06N 5/00* | (2023.01) |
| *G06N 5/04* | (2023.01) |

(52) U.S. Cl.
CPC ........ *G06F 11/079* (2013.01); *G06F 11/0721* (2013.01); *G06N 5/04* (2013.01)

(58) Field of Classification Search
CPC ...... G06F 11/079; G06F 11/0721; G06N 5/04
See application file for complete search history.

(56) References Cited

U.S. PATENT DOCUMENTS

| | | | |
|---|---|---|---|
| 11,188,405 B1* | 11/2021 | Garty | G06F 11/0751 |
| 2017/0249200 A1* | 8/2017 | Mustafi | G06F 11/0709 |
| 2023/0112346 A1* | 4/2023 | Wang | G06N 3/08 |
| | | | 714/25 |

* cited by examiner

*Primary Examiner* — Philip Guyton
*Assistant Examiner* — Sean Kevin McNamara
(74) *Attorney, Agent, or Firm* — WOMBLE BOND DICKINSON (US) LLP

(57) ABSTRACT

Methods and systems for managing a data processing system are disclosed. A data processing system may detect one or more actions being taken by a user to resolve a current or predicted issue of the data processing system. Based on the detection, the data processing system may generate predictive implications to notify and/or alert the user of the implications (e.g., consequences) of these actions. These predictive implications may be used (e.g., by the user or by the data processing system itself) to advantageously prevent further, uninformed and unintended, complications to the data processing system.

20 Claims, 9 Drawing Sheets

DATA PROCESSING SYSTEM MANAGEMENT USING PREDICTIVE IMPLICATIONS OF USER ACTIONS

FIELD

Embodiments disclosed herein relate generally to device management. More particularly, embodiments disclosed herein relate to systems and methods managing data processing systems using predictive implications of user actions on a state of the data processing systems.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
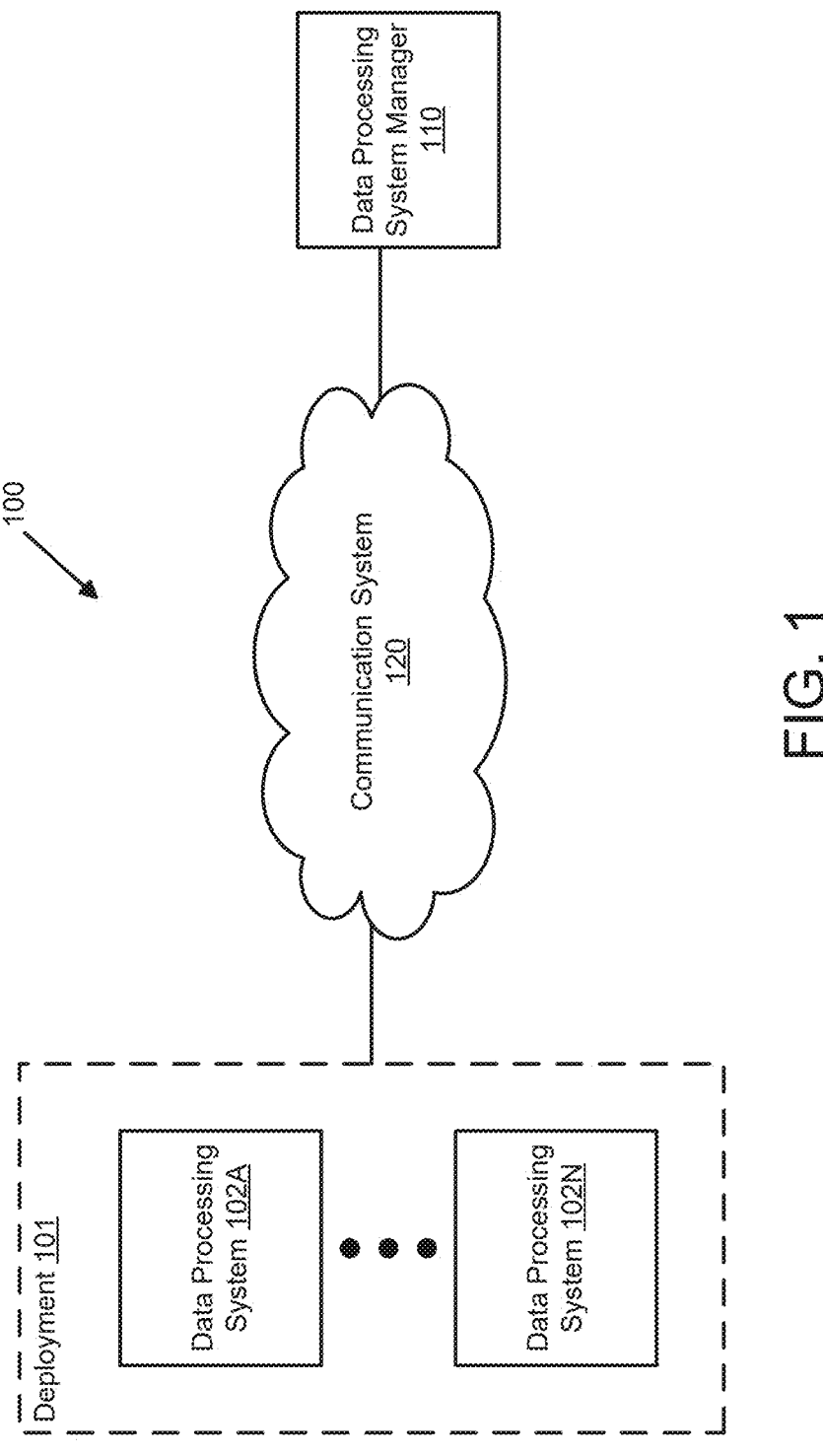
FIG. 1 shows a block diagram illustrating a system in accordance with one or more embodiments.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems. In particular, data processing systems (see, e.g., the computing device of FIG. 4) break down. Such breakdowns (also referred to herein as "an incident" or "incidents") may be caused by an issue with the data processing systems' hardware, software, or a combination of both. To resolve such incidents, users of a data processing system may with to implement one or more actions (e.g., hardware related actions, software related actions, or a combination of both) to restore the data processing system back to a normal working state.

However, users may not be aware that their actions may cause further issues to the already (or potentially going to be) broken down data processing system. Data processing systems are also not currently equipped to inform users of such further issues. These further issues may place the data processing system in an even more undesirable state that the user is not able to fix without intervention by a manufacturer and/or provider of the data processing system (e.g., through a dispatch of a trained technician or the like), which not only makes it more frustrating for the user and the data processing system will remain in an inoperable state for longer (e.g., have more downtime where the user cannot use the data processing system for what the user needs) but also increases the costs to the manufacturer and/or provider as the number of dispatches grows due to further issues facilitated by user's trying to apply fixes themselves. Said another way, users do not appreciate the full extent of the implications that could be caused by one or more actions that they may take to fix their systems.

For example, assume that a hard drive of the data processing system stops working. A user may try to fix the hard drive issue by updating a firmware of the hard drive without knowing that such a firmware update may cause other issues for other components of the data processing system (and/or to the already broken hard drive) while a simple replacement of the broken hard drive with a new one would have easily resolved the incident. As a result, the user is now left with an even more damaged system and a long wait time for a technician to come out to diagnose and resolve the additional issues.

As another example, keeping a data processing system up-to-date with respect to drivers and firmware is always best practice. However, this requires constant monitoring of the data processing system's device drivers/firmware across various environments. Some of the drivers/firmware requires a restart of the data processing system, which may not be possible while the data processing system is being utilized for critical operations that cannot be paused. Thus, a user thinking that a quick firmware update may resolve an issue that the data processing system is experiencing may not be aware that the update may lead to the disruption of such critical operations that are currently running on the data processing system due to system downtime required for the restart.

To resolve such situations where user actions may lead to further, unintended, complications (including the limitation of data processing systems not being able to provide users with information regarding the implications of the user's actions on the system), one or more embodiments provide users with predictive implications for their actions. In particular, various machine learning models (also referred to herein as "inference models") may be used to analyze a user's data processing system to determine how the user's intended actions would (positively or negatively) affect the data processing system.

More specifically, a first inference model may be trained (e.g., as an incident model) to predict incidents that could occur to a data processing system should one or more actions be performed by a user of the data processing system. For example, when a user is in the process of implementing a "firmware update" action to resolve a current (or predicted) issue with the data processing system, the data processing system may alert the user that such a "firmware update" action will cause the component being updated with the new firmware to completely cease functionality (e.g., not function). Thus, the user is advantageously provided with the implications of the user's desired/intended "firmware update" action such that the user may halt such action before causing more issues to the data processing system. In embodiments, the first inference model may also be trained to predict issues that may occur with the data processing system (e.g., generate predictive alerts about a possible/ potential failure of the data processing system).

In embodiments, a second inference model may be trained (e.g., as a fix model) to generate potential fixes for a data processing system that is experiencing one or more issues. This second inference model may be trained using known fixes documented in knowledge base (KB) articles, completed support request (SR) tickets, or the like. Additional details regarding the training of the first and second inference models will be discussed below in reference to FIGS. 2A-2B.

In embodiments, the first and second inference models may be trained by a data processing system manager that manages the data processing system. The data processing system manager may be maintained by a manufacturer and/or provider of the data processing system at a site remote to the data processing system. Once trained, the first and second inference models may be synced to an environment (e.g., deployment) containing the data processing system to be customized for that specific environment (e.g., customized specifically for that data processing system) as deployment-specific trained inference models. Additional details regarding the customization of the first and second inference models will be discussed below in reference to FIG. 2C.

In combination, the two inference models may be used to make a user aware of implications associated with the user's actions to a data processing system and suggest and/or apply automatic (best possible) fixes to the data processing system that could avoid further complications to the data processing system. The data processing system may also be configured to implement (e.g., perform) the automatic fixes during low use and/or idle time of the device, which may be determined using the first trained inference model. Additional details regarding the generation of predictive implications and the implementation (e.g., performance) of fixes will be discussed below in reference to FIG. 2D.

Thus, embodiments disclosed herein may provide, among others, an improvement (e.g., a technical improvement) to the above-discussed limitations of data processing systems' ability to provide users with implications regarding one or more user actions on a system. By providing predictive implications to users, further complications (in addition to currently experienced or currently predicted issues) to a data processing system may be avoided. As a result, additional downtime and problems caused by such further complications can also be avoided, which directly improves the functionalities (e.g., computer functionalities) of these data processing systems.

Said another way, these data processing systems are able to themselves actively prevent users from causing further, usually uninformed and unintended, damage to the data processing systems. Thus, embodiments disclosed herein may also advantageously reduce the number of dispatches (e.g., provided by a manufacturer and/or provider of the systems) required to resolve an incident, which significantly reduces the costs associated with such dispatches.

In an embodiment, a method for managing a data processing system is provided. The method may include: determining occurrence of a trigger event, the trigger event being associated with an incident associated with the data processing system; generating, in response to the determination, a user action implication report, the user action implication report comprising one or more actions that can be taken by the user to resolve the incident and one or more implications associated with each of the one or more actions, each of the one or more implications specifying what would happen to the data processing system should a user execute each of the one or more actions; and providing the user action implication report to the user of the data processing system to prevent execution, by the user and in response to an attempt by the user to resolve the incident, of an action among the one or more actions associated with a negative one of the one or more implications to the data processing system.

Performance of the action among the one or more actions associated with the negative one of the one or more implications renders the data processing system unusable to the user.

The data processing system is part of a deployment. Before the occurrence of the trigger event, the method further comprises: obtaining, from a data processing system manager a first deployment-specific trained inference model for the deployment, the first deployment-specific trained inference model being trained to predict the one or more implications, and a second deployment-specific trained inference model for the deployment, the second deployment-specific trained inference model being trained to output suggested resolutions for avoiding the one or more implications.

The user action implication report is generated using the first deployment-specific trained inference model and the second deployment-specific trained inference model.

The trigger event comprises a detection by the data processing system that the user is about to perform at least one of the one or more actions specified in the user action implication report.

The detection is performed in real time as the user is in the process of performing the at least one of the one or more actions.

The detection is in response to obtaining the one or more actions as a proposed plan of action from the user.

The trigger event comprises a prediction by the data processing system, using the first deployment-specific trained inference model, that the incident will occur at a future point in time.

The first deployment-specific trained inference model is further trained to generate the prediction.

The method further comprising: after providing the user implication action report to the user, performing one or more action sets to obtain an incident resolved data processing system; providing information regarding the one or more action sets to the data processing system manager; and obtaining an updated one of the first deployment-specific trained inference model and an updated one of the second deployment-specific trained inference model that are each further trained using the information regarding the one or more action sets.

A non-transitory media may include instructions that when executed by a processor cause the computer-implemented method to be performed.

A data processing system may include the non-transitory media and a processor, and may perform the computer-implemented method when the processor executes the instructions in the non-transitory media.

Turning to FIG. 1, a block diagram illustrating a system 100 in accordance with an embodiment is shown. The system 100 shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing systems 102A-102N. The data processing systems 102A-102N may be grouped together within one or more deployments 101 (e.g., a server farm, a collection of computing devices within an entity, a data center, or the like). Each deployment 101 may include at least one of the data processing systems 102A-102N.

Data processing systems 102A-102N may provide the computer implemented services to users of data processing systems 102A-102N and/or to other devices (not shown). Different data processing systems 102A-102N may provide similar and/or different computer implemented services.

To provide the computer implemented services, data processing systems 102A-102N may include various hardware components (e.g., processors, memory modules, storage devices, peripheral devices, etc.) and host various software components (e.g., operating systems, application, startup managers such as basic input-output systems, etc.). These hardware and software components (see, e.g., the components discussed below in FIG. 4) may provide the computer implemented services via their operation.

The software components may be implemented using various types of services. For example, each data processing system of the data processing systems 102A-102N may host various services that provide the computer implemented service (e.g., application services) and/or that manage the operation of these services (e.g., management services). The aggregate (e.g., combination) of the management and application services may be a complete service that provide desired functionalities.

To manage the data processing systems 102A-102N, the system of FIG. 1 may include data processing system manager 110. Data processing system manager 110 may include various hardware components (e.g., processors, memory modules, storage devices, peripheral devices, etc.) and host various software components (e.g., operating systems, application, startup managers such as basic input-output systems, etc.). These hardware and software components may provide the functionalities (e.g., the communication with and management of the data processing systems) of the data processing system manager 110.

In one example, the data processing system manager 110 may be a computing device (e.g., computing device of FIG. 4) such as a desktop computer or server that is used by used by manufacturers (or distributors, administrators, etc.) of one or more components installed within the data processing systems 102A-102N to communicate with and manage (namely, the components installed within) the data processing systems 102A-102N.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the Internet Protocol).

Additionally, any of data processing systems 102A-102N and data processing system manager 110 may be configured to host one or more inference models (e.g., computer-implemented machine learning and/or artificial intelligence (ML/AI) models). Additional details regarding these models will be discussed below in reference to FIGS. 2A-2D.

While FIG. 1 is illustrated as including a limited number of specific components, a system in accordance with an embodiment may include fewer, additional, and/or different components than those illustrated therein.

Figure 2A:
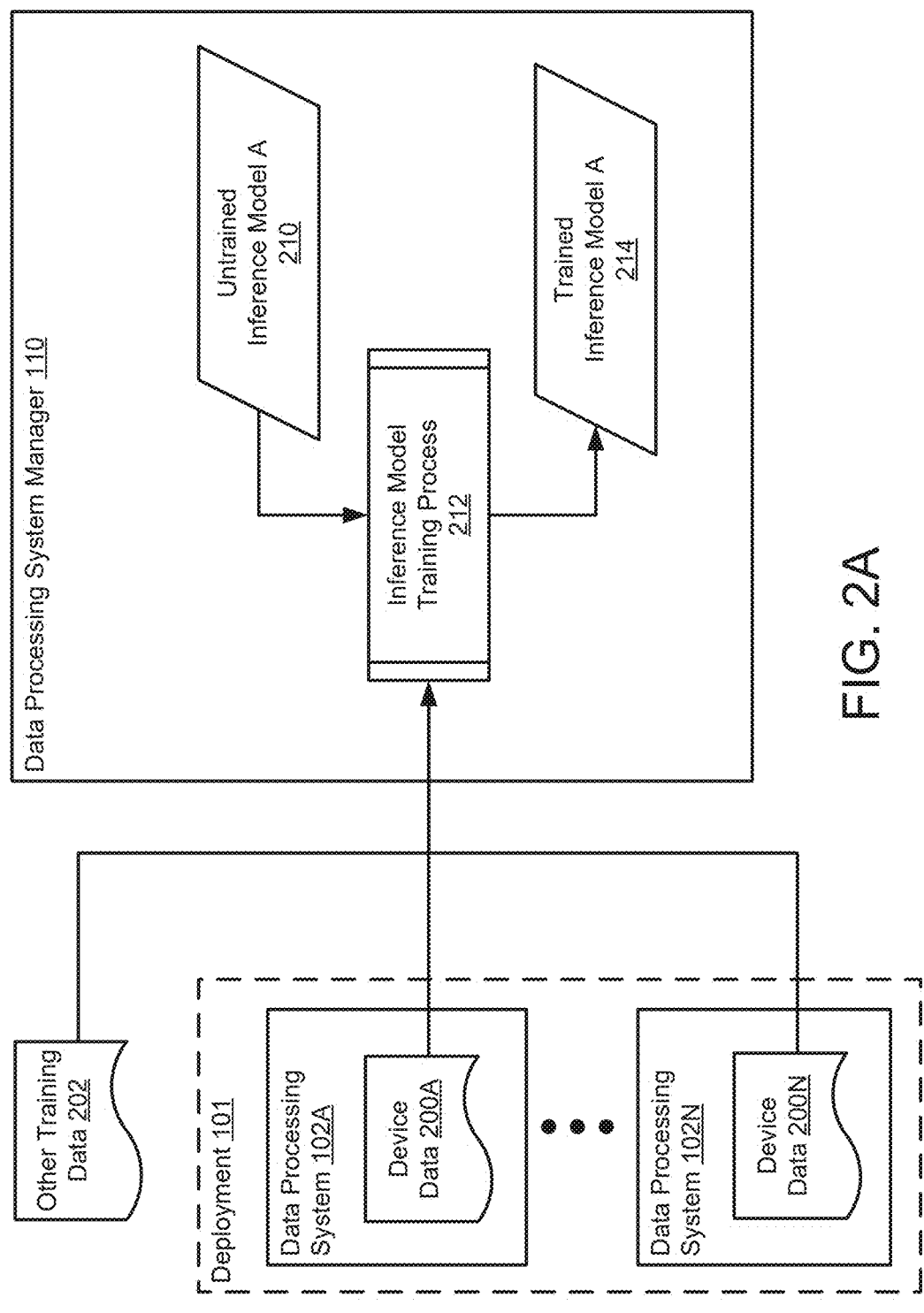
FIGS. 2A-2D show data flow diagrams in accordance with one or more embodiments.
Figure 2B:
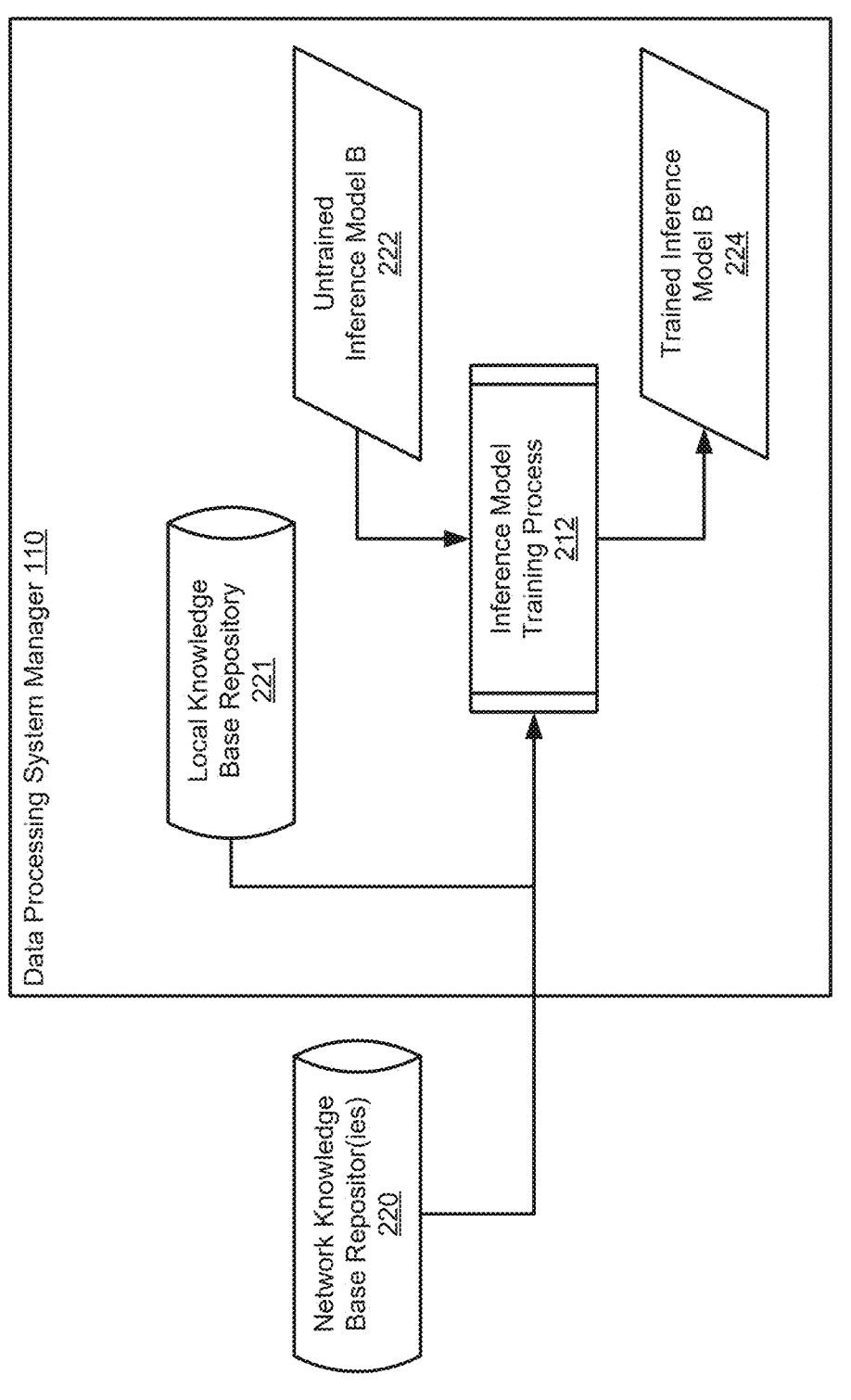

To further clarify embodiments disclosed herein, data flow diagrams in accordance with one or more embodiments disclosed herein is shown in FIGS. 2A-2B. In these diagrams, flows of data and processing of data are illustrated using different sets of shapes. A first set of shapes (e.g., 202A, 202B, 200A-200N, etc.) is used to represent data structures (e.g., files, data packets, or the like), a second set of shapes (e.g., 212, 230, etc.) is used to represent processes performed using and/or that generate data, a third set of shapes (e.g., 102A-102N, 110, etc.) is used to represent the components (e.g., devices) that perform the processes shown using the second set of shapes, a fourth set of shapes (e.g., 220, 221, etc.) is used to represent large scale data structures such as databases, and a fifth set of shapes (e.g., 210, 214, etc.) is used to represent inference models.

Starting with FIG. 2A, a first data flow diagram in accordance with one or more embodiments is shown. The data flow diagram may illustrate a generation and training of an incident model used to generate predictions and/or inferences of incident(s) of a data processing system. The generation and training of the incident model may be performed by any of the data processing systems 102A-102N and the data processing system manager 110 shown in FIG. 1. In the example shown in FIG. 2A, the generation and training of the incident model is performed by the data processing system manager 110.

In particular, the data processing system manager 110 may obtain (e.g., gather) data (e.g., device data 200A-200N from data processing systems 102A-102N, respectively, and other training data 202) from various sources to train untrained inference model A 210 using inference model training process 212.

In embodiments, device data 200A-200N retrieved from data processing systems 102A-102N, respectively, may contain operation data of these data processing systems 102A-102N. For example, these data processing systems 102A-102N may be configured (e.g., with applications and agents) that automatically collect and upload telemetry (or other similar information) to the data processing system manager 110 at predetermined intervals set by a user and/or administrator of the data processing systems 102A-102N. Such telemetry data may also be uploaded whenever an event (e.g., an incident) occurs at each of the data processing systems 102A-102N (e.g., the telemetry data upload may be alert-based). Such telemetry data may include, for example: technical support reports (TSRs); life cycle logs; system event logs; device information including device component (e.g., hardware and software) information (e.g., model, driver, version, or the like); or the like.

Other training data 202 may include similar telemetry data obtained from data processing systems associated with other deployments (e.g., deployments besides deployment 101). Other training data 202 may also include support ticket data that are generated in response to a customer (e.g., a user of any of the data processing systems) contacting (e.g., calling, emailing, chatting using a chatbot, or the like) a technical support personnel of a manufacturer and/or provider of the data processing systems.

In embodiments, in addition to the telemetry data, device metadata of each data processing systems 102A-102N may also be included in the device data 200A-200N and/or the other training data 202. Such device metadata may be gathered from any source including directly from the data processing systems 102A-102N, from the manufacturer and/or provider of the data processing systems 102A-102N, or the like. Such device metadata may also include any and all information associated with a respective data processing system (e.g., a model number, a unique identifier (ID) of the data processing system, warranty information, a production date, or the like).

In embodiments, in addition to the above discussed data, any and all types of data not mentioned that can also be used to train inference models to generate predictions and/or inferences regarding incidents (e.g., issues) experienced by data processing systems may also be collected (e.g., as any of the device data 200A-200N and other training data 202) without departing from the scope of embodiments disclosed herein. The data included in any of the device data 200A-200N and other training data 202 may also be structured and/or unstructured data.

Untrained inference model A 210 may be any type of inference model e.g., any type of ML/AI models or even general non-ML/AI computing models) that may be trained to generate predictions and/or inferences usable to recognize patterns, automate tasks, and/or make decisions. The inference models may, for example, be implemented with any of model usable for learning purposes. The type of inference model used may depend on the goals of the downstream consumers and/or other factors such as (i) training dataset characteristics (e.g., data type, size and/or complexity), (ii) cost limitations (e.g., the cost to train and/or maintain the inference model), (iii) time limitations (e.g., the time to train the inference model and/or for inference generation), and/or (iv) inference characteristics (e.g., accuracy and/or inference type).

For example, a complex inference model such as a muti-layered neural network (e.g., used in large language models, or the like) may process a large amount of complex data and generate highly accurate inferences, but may be costly to train and maintain and may have low explainability (e.g., may act as a "black box"). In contrast, a linear regression and/or decision tree models may be a simpler, less costly inference model with high explainability, but may only be well-suited for data whose labels are linearly correlated with the selected features and may generate less accurate inferences than a neural network.

Inference model training process 212 may employ various combinations of machine-learning techniques such as supervised learning (e.g., for labeled training data), and/or unsupervised learning (e.g., for unlabeled data) to produce any number of trained inference models, including trained inference model A 214. The trained machine-learning models may be implemented using other modalities (e.g., semi-supervised learning, reinforced learning, associative rules, etc.). As part of the training process, the trained inference model may undergo a validation and/or testing step to improve and/or measure the reliability of generated inferences. Any number of inference models may be trained using inference model training process 212. Any known techniques and methods used to train inference models may be used as part of inference model training process 212 without departing from embodiments disclosed herein.

In embodiments, the device data 200A-200N and other training data 202 obtained to train untrained inference model A 210 using inference model training process 212 may be processed in any way (e.g., any way suitable for processing data for training ML/AI models such as data filtering, data labeling, or the like) without departing from the scope of embodiments disclosed herein.

As shown in FIG. 2A, trained inference model A 214 may be generated using inference model training process 212. In embodiments, trained inference model A 214 may be an incident model that is trained to generate predictions and/or inferences associated with incidents of data processing systems. Said another way, the incident model may be used to predict and/or inference any number of incidents that may occur should certain conditions be detected on a specific data processing system. The conditions may be any type of conditions (e.g., a type or model of the data processing system, a current operation of the data processing system, the components (and statuses/conditions thereof) installed within the data processing system, a user action implemented on the data processing system, or the like) associated with the data processing system and/or operations of the data processing system.

Said another way, based on conditions A, B, C being detected with respect to a specific data processing system 102A, the incident model may predict and/or inference that incidents X, Y, Z are likely to occur (e.g., using historical data and patterns included in the device data 200A-200N and other training data 202 used to train the untrained inference model A 210 into trained inference model A 214).

Turning now to FIG. 2B, a second data flow diagram in accordance with one or more embodiments is shown. The second data flow diagram may illustrate a generation and training of a fix model used to generate predictions and/or inferences of fix(es) that could be applied to resolve one or more incidents being experienced by a data processing system. The generation and training of the fix model may be performed by any of the data processing systems 102A-102N and the data processing system manager 110 shown in FIG. 1. In the example shown in FIG. 2B, the generation and training of the incident model is performed by the data processing system manager 110.

In particular, the data processing system manager 110 may obtain (e.g., gather) data (e.g., device data 200A-200N from data processing systems 102A-102N, respectively, and other training data 202) from various sources to train untrained inference model B 222 using inference model training process 212. More specifically, as shown in FIG. 2B, data processing system manager 110 may obtain data from network knowledge base repositor(ies) 220 and local knowledge base repository 221.

Each of network knowledge base repositor(ies) 220 and local knowledge base repository 221 may be configured to store any number of knowledge base (KB) articles detailing known fixes (e.g., resolutions) to various incidents experienced by one or more data processing systems. In addition to KB articles, other types of documentations (e.g., support request tickets, or the like) documenting potential and/or known fixes to one or more incidents that could be (or has been) experienced by one or more data processing systems can also be included in each of the network knowledge base repositor(ies) 220 and local knowledge base repository 221 without departing from the scope of embodiments disclosed herein. Said another way, any and all types of data in any format (and from any source, public or private) that can be used to train untrained inference model B to generate predictions and/or inferences associated with fixing one or more incidents that could be (or has been) experienced by one or more data processing systems may be included in any of network knowledge base repositor(ies) 220 and local knowledge base repository 221.

Similar to untrained inference model A 210, untrained inference model B 222 may be any type of inference model (e.g., any type of ML/AI models or even general non-ML/AI computing models) that may be trained to generate predictions and/or inferences usable to recognize patterns, automate tasks, and/or make decisions. The inference models may, for example, be implemented with any of model usable for learning purposes. The type of inference model used may depend on the goals of the downstream consumers and/or other factors such as (i) training dataset characteristics (e.g., data type, size and/or complexity), (ii) cost limitations (e.g., the cost to train and/or maintain the inference model), (iii) time limitations (e.g., the time to train the inference model and/or for inference generation), and/or (iv) inference characteristics (e.g., accuracy and/or inference type).

For example, a complex inference model such as a muti-layered neural network (e.g., used in large language models, or the like) may process a large amount of complex data and generate highly accurate inferences, but may be costly to train and maintain and may have low explainability (e.g., may act as a "black box"). In contrast, a linear regression and/or decision tree models may be a simpler, less costly inference model with high explainability, but may only be well-suited for data whose labels are linearly correlated with the selected features and may generate less accurate inferences than a neural network.

As discussed above in reference to FIG. 2A, inference model training process 212 may employ various combinations of machine-learning techniques such as supervised learning (e.g., for labeled training data), and/or unsupervised learning (e.g., for unlabeled data) to produce any number of trained inference models, including trained inference model B 224. The trained machine-learning models may be implemented using other modalities (e.g., semi-supervised learning, reinforced learning, associative rules, etc.). As part of the training process, the trained inference model may undergo a validation and/or testing step to improve and/or measure the reliability of generated inferences. Any number of inference models may be trained using inference model training process 212. Any known techniques and methods used to train inference models may be used as part of inference model training process 212 without departing from embodiments disclosed herein.

In embodiments, the data stored in network knowledge base repositor(ies) 220 and local knowledge base repository 221 obtained to train untrained inference model B 222 using inference model training process 212 may be processed in any way (e.g., any way suitable for processing data for training ML/AI models such as data filtering, data labeling, or the like) without departing from the scope of embodiments disclosed herein.

As shown in FIG. 2B, trained inference model B 224 may be generated using inference model training process 212. In embodiments, trained inference model B 224 may be a fix model that is trained to generate predictions and/or inferences associated with fixes to incidents of data processing systems. Said another way, the fix model may be used to predict and/or inference any number of fixes that may be used to restore a data processing system experiencing (or that will potentially experience an incident) to the pre-incident state (or to prevent the potential incident). For example, assume that a data processing system 102A has a broken hard drive (e.g., the incident), the fix model may generate any number of suggested/recommended fixes for fixing the broken hard drive (e.g., resolving the incident). Each of the suggested recommend fixes may be a temporary or permanent fix.

Figure 2C:
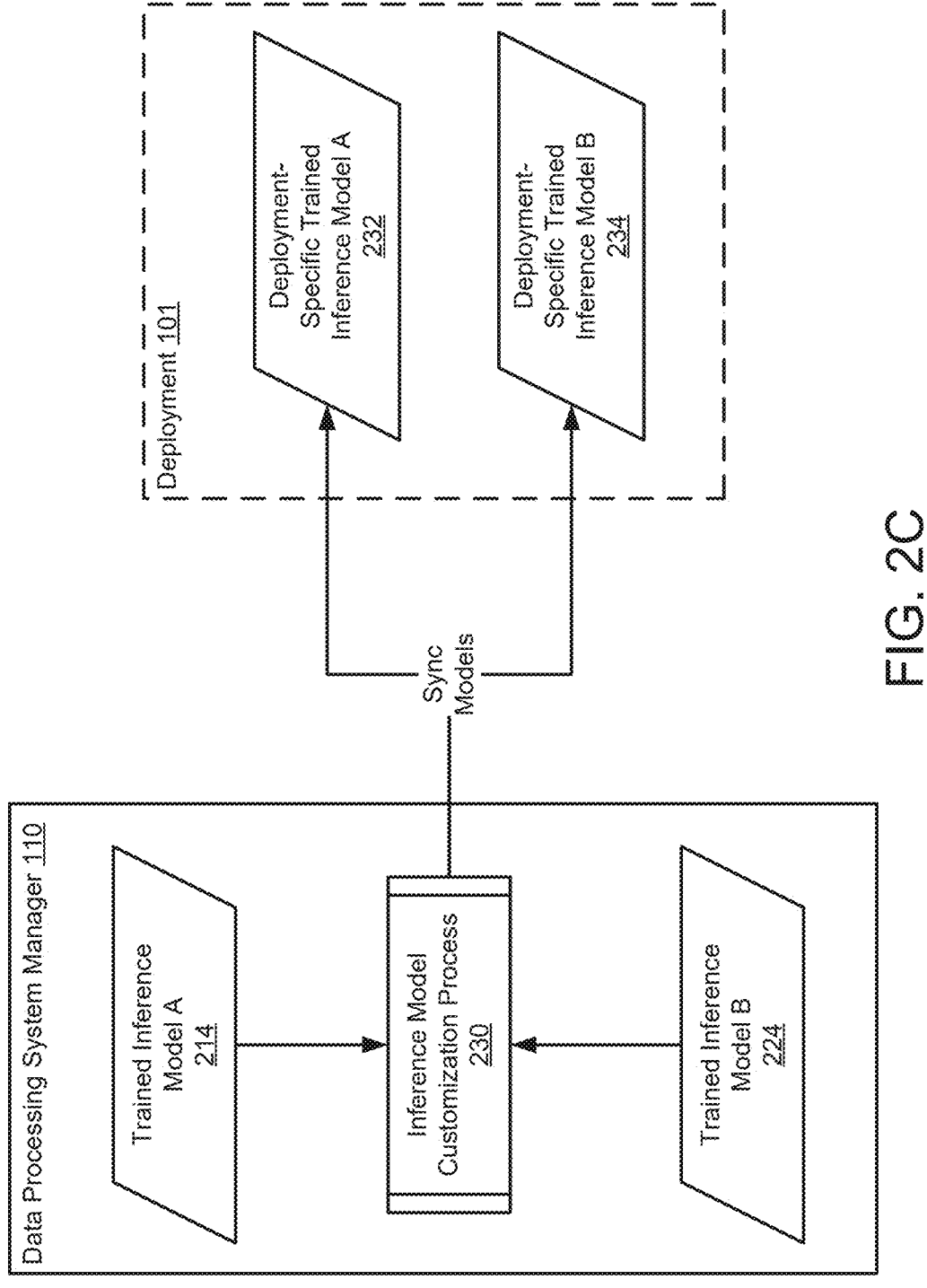

Turning now to FIG. 2C, a third data flow diagram in accordance with one or more embodiments is shown. The data flow diagram may illustrate a process for customizing one or more trained inference models for a specific deployment.

In particular, as shown in FIG. 2C, the trained inference model A 214 and trained inference model B 224 from FIGS. 2A and 2B, respectively, are provided into inference model customization process 230 to generate deployment-specific trained inference model A 232 and deployment-specific trained inference model B 234 for deployment 101.

As part of inference model customization process 230, the trained inference model A 214 and trained inference model B 224 may be customized using data specific to the data processing systems within a deployment (e.g., here the data processing systems of deployment 101) to generate predictions and/or inferences for these specific data processing systems. Such customization allows the predictions and/or inferences generated by deployment-specific trained inference model A 232 and deployment-specific trained inference model B 234 to be more accurate for the specific data processing systems included in a deployment. Said another way, deployment-specific trained inference model A 232 is an incident model specifically customized for the data processing systems at deployment 101 and deployment-specific trained inference model B 234 is a fix model specifically customized for the data processing systems at deployment 101.

In embodiments, to ensure the highest level of accuracy for each of the deployment-specific trained inference model A 232 and deployment-specific trained inference model B 234, data processing system manager 110 (or the data processing systems at deployment 101 themselves) may cause the data processing systems at deployment 101 to continuously provide data processing system manager 110 with any updates (e.g., firmware, hardware, or the like updates) to the data processing systems at deployment 101. Each time an update is received from the data processing systems at deployment 101, the inference model customization process 230 may be repeated to apply these updates to the deployment-specific trained inference model A 232 and deployment-specific trained inference model B 234.

For example, assume that one of the data processing systems at deployment 101 was updated to include a new peripheral device (e.g., a network interface card (NIC)), such an update is relayed to data processing system manager 110 and used to update the deployment-specific trained inference model A 232 and deployment-specific trained inference model B 234.

Once the deployment-specific trained inference model A 232 and deployment-specific trained inference model B 234 are generated by the data processing system manager 110, they are provided (e.g., transmitted) to deployment 101 where they may be hosted by any of the data processing systems located at deployment 101. Said another way, assuming that deployment 101 is an edge network, the deployment-specific trained inference model A 232 and deployment-specific trained inference model B 234 are synchronized to this edge network.

Figure 2D:
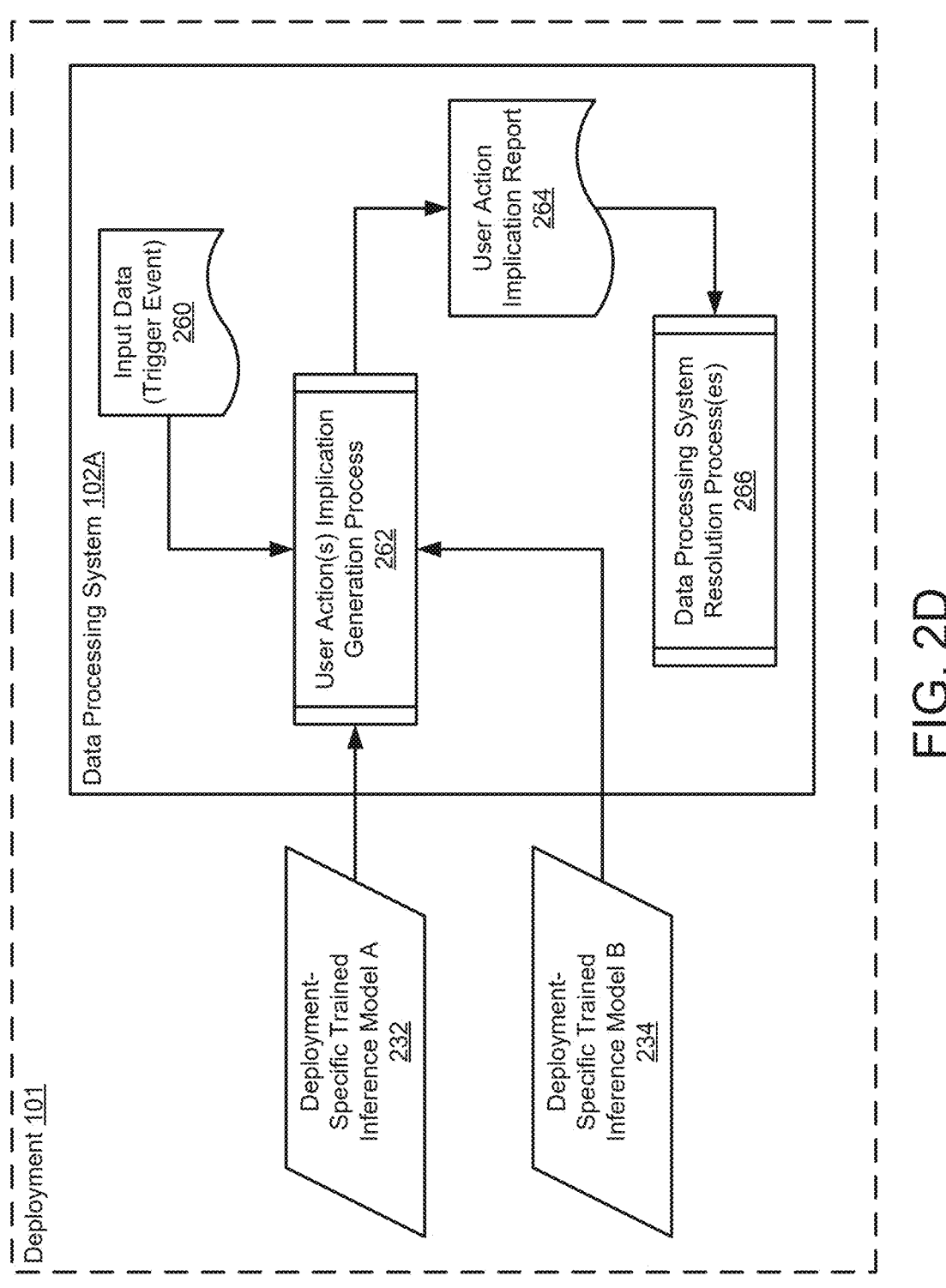

Turning now to FIG. 2D, a fourth data flow diagram in accordance with one or more embodiments is shown. The fourth data flow diagram may illustrate a user action implication report generation process.

In particular, as shown in FIG. 2D, an input data (e.g., a trigger event) is obtained by the data processing system 102A of deployment 101. The trigger event may include a detection by the data processing system that the user is about to perform one or more actions to resolve an incident associated with the data processing system 102A. In embodiments, the detection may be performed in real time as the user is in the process of performing the action(s) or may be in response to the user reporting the action(s) as part of a proposed plan of action from the user for resolving the incident.

For example, assume that the incident is that the hard drive of the data processing system 102A has failed. In response to this hard drive failure, the user may be attempting to update the hard drive firmware as the action for resolving the incident. The data processing system 102A may detect the user's intention to update the hard drive firmware (e.g., either as the user is in the process of performing the update or as part of a proposed plan submitted by the user to the data processing system 102A via a graphical user interface displayed on the data processing system 102A).

In embodiments, the trigger event may also include a predictive alert generated by the deployment-specific trained inference model A 232 about a potential incident that may occur with the data processing system 102A (e.g., a potential error and/or breakdown of the data processing system 102A) at a future point in time. Said another way, the trigger event may be a prediction by the deployment-specific trained inference model A 232 that one or more of the components (software and/or hardware) of the data processing system 102A will fail.

The input data (trigger event) 260 is provided to user action implication generation process 262 where the input data (trigger event) 260 along with deployment-specific trained inference model A 232 and deployment-specific trained inference model B 234 are used to generate a user action implication report 264. Said another way, the input data (trigger event) 260 is used in combination with other conditions of the data processing system 102A as input data into these two inference models for these inference models to generate predictions and/or inferences using such input data.

The user action implication report 264 may include one or more implications (e.g., generated as part of the output(s) of the deployment specific trained inference model A 232) specifying what would happen to the data processing system 102A should a user execute one or more actions to resolve the incident associated with the input data (trigger event) 260.

For example, assume again that a component of the data processing system 102A has failed and that the data processing system 102A has detected that the user is performing (or about to perform) an action of upgrading the firmware of the component that has failed, the user action implication report 264 generated based on this situation may indicate (e.g., to the user and as the implication included in the report) that other components of the data processing system 102A may also fail as a result of the action of upgrading the firmware.

As another example, assume that a predictive alert indicating that a component of the data processing system 102A may likely fail within the next three (3) days. This predictive alert (used as input data (trigger event) 260) may be included in a generated user action implication report 264. In this example, the user action implication report 264 may also include one or more actions that the user may take to prevent/avoid the predicted component failure. With each of the one or more actions, an implication (or implications) of each of the actions may also be included to indicate what will happen should a specific action be implemented/performed (e.g., either by the user or by the data processing system 102A itself).

In embodiments, the user action implication report 264 may also include suggested/recommended fixes for resolving the incident (e.g., as part of the output of the deployment-specific trained inference model B 234 (e.g., the fix model specific to deployment 101)).

Using the implications included in the user action implication report 264, the user of the data processing system 102A (or the data processing system 102A itself) may (e.g., as part of data processing system resolution processes (266)) determine whether an action currently being performed (or contemplated) by the user (or the data processing system 102A itself) should actually be performed.

For example, in the above example where the user action implication report 264 indicates that a user's action of upgrading the firmware of a failed component will result in additional component failures, the user may choose to not continue with (or even start) the action of upgrading the firmware of the failed component. Instead, the user (or the data processing system 102A itself) may choose to proceed with one of the suggested/recommended fixes included in the user action implication report 264.

In embodiments where the data processing system 102A is automatically applying one or more of the suggested/recommended fixes included in the user action implication report 264, the data processing system 102A may use deployment-specific trained inference model A (or a separately configured timeseries model) to determine an idle time of the data processing system 102A to perform the one or more of the suggested/recommended fixes (e.g., to obtain an incident resolved data processing system). This advantageously avoids implementation of one or more fixes while the data processing system 102A may be performing one or more critical operations, which may be disrupted as the fix(es) are being implemented.

This idle time information may also be provided to the user if the user chooses to manually apply one or more of the suggested/recommended fixes included in the user action implication report 264.

In embodiments, after performance of the data processing system resolution process(es) 266, the data processing system 102A may (as discussed above in refence to FIG. 2C) report any changes its configuration to the data processing system manager 110 where the data processing system manager 110 will use these reported changes to update the deployment-specific trained inference model A 232 and deployment-specific trained inference model B 234 and synchronize the updated ones of the deployment-specific trained inference model A 232 and deployment-specific trained inference model B 234 to the deployment 101.

Any of the processes illustrated using the second set of shapes (shown in FIGS. 2A-2B) may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Figure 3A:
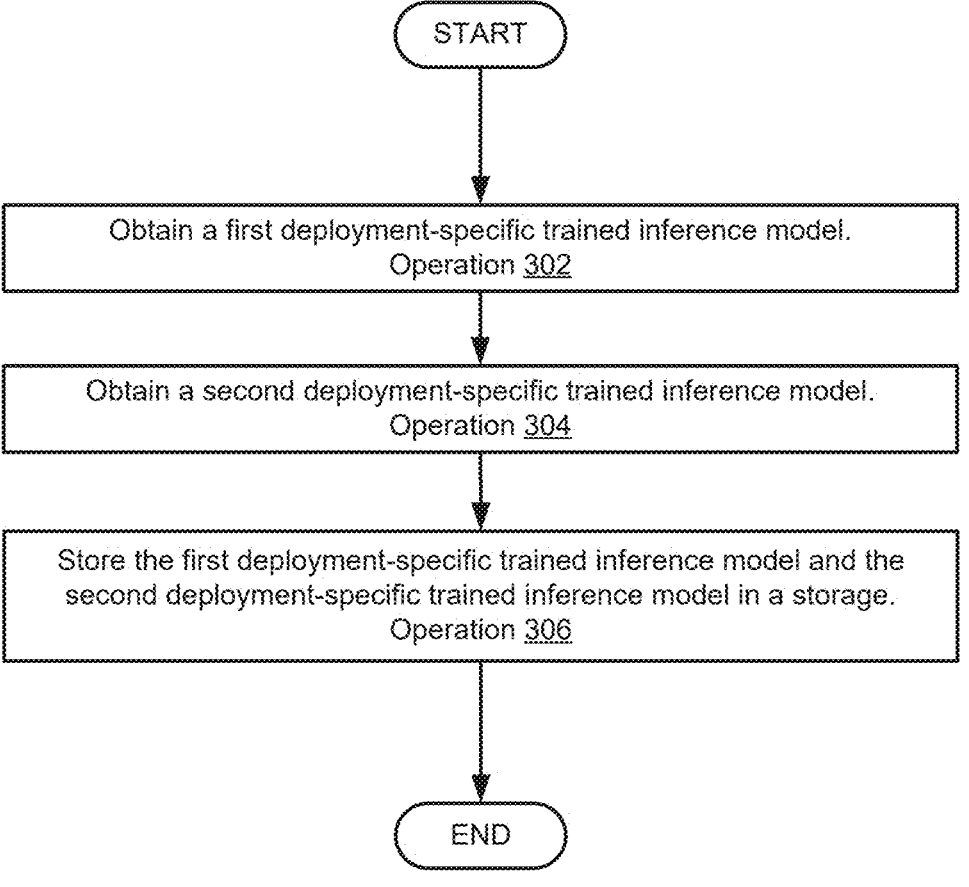
FIGS. 3A-3C show flowcharts in accordance with one or more embodiments.
Figure 3B:
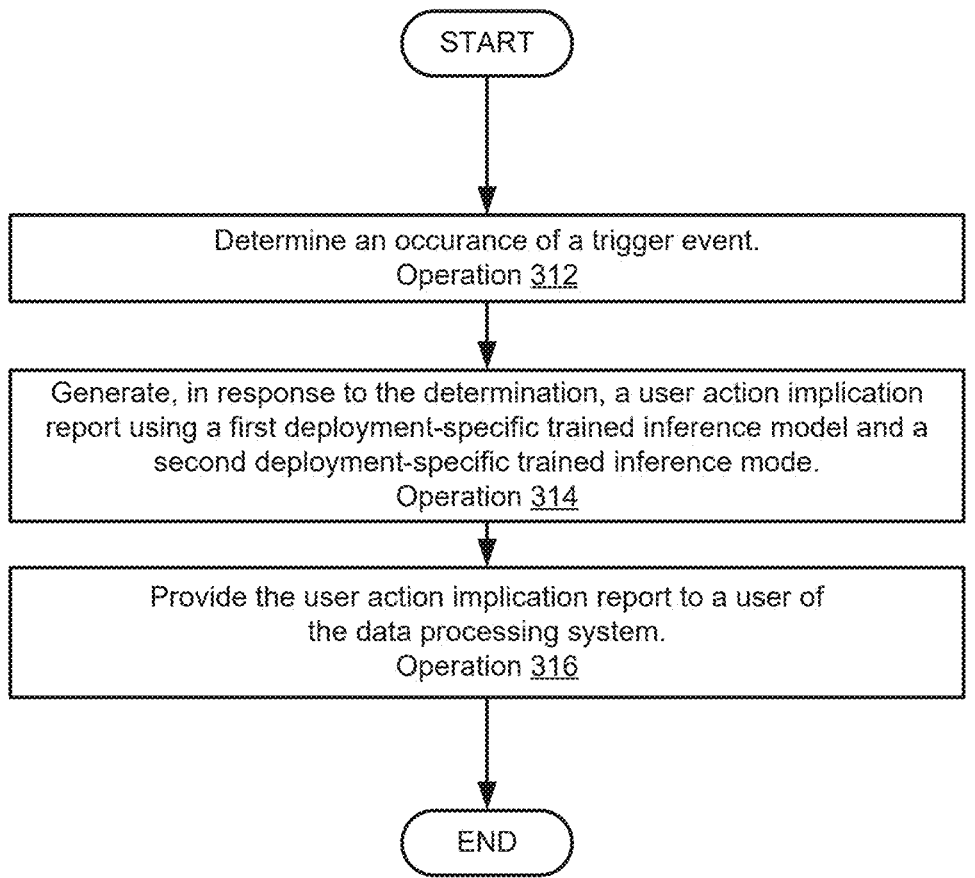
Figure 3C:
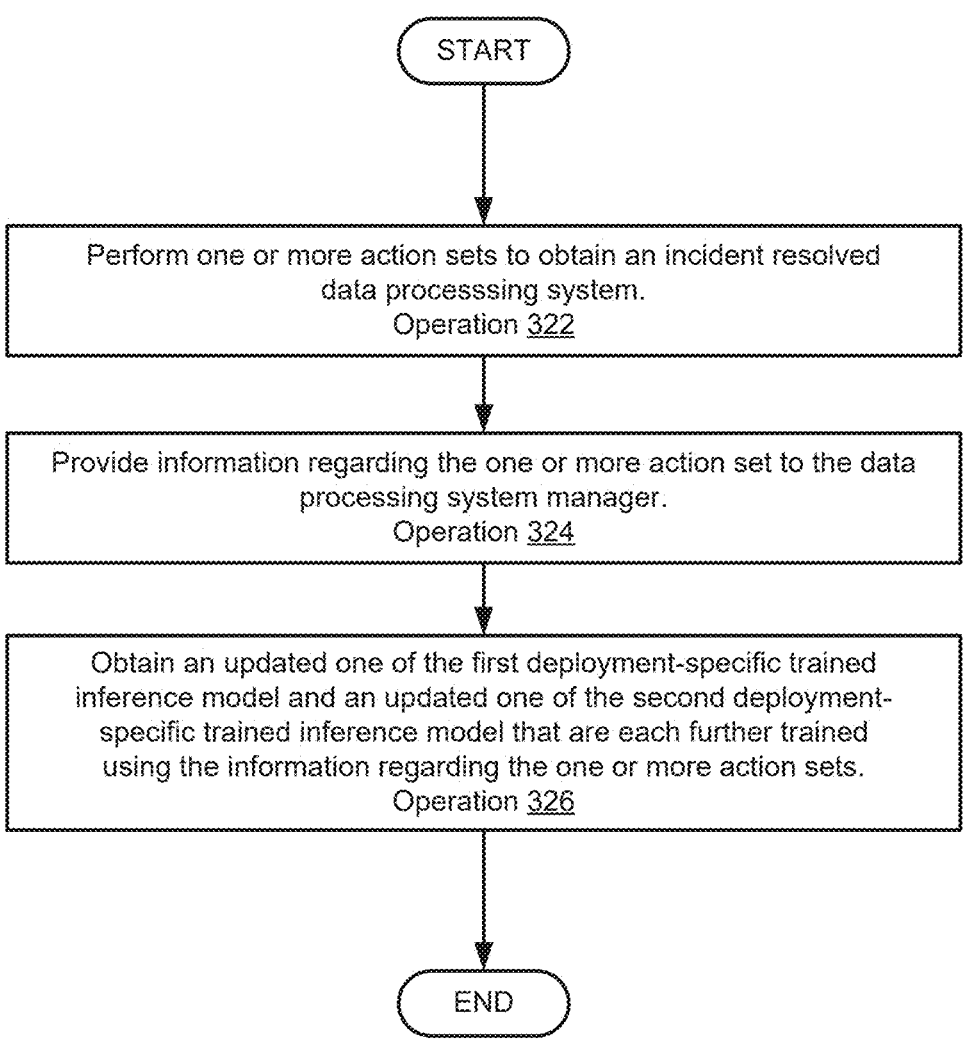

As discussed above, the components of FIG. 1 may perform various methods for managing a boot up process of a data processing system. FIGS. 3A-3C illustrate examples of methods that may be performed by the components of FIG. 1. For example, any of the data processing systems 102A-102N and the data processing system manager 110 shown in FIG. 1 may perform all or a portion of the methods. In the diagrams discussed below and shown in FIGS. 3A-3C, any of the operations may be repeated, performed in different orders, and/or performed in parallel with or in a partially overlapping in time manner with other operations.

Starting with FIG. 3A, in operation 302 and as discussed above in reference to FIGS. 2A and 2C, a first deployment-specific trained inference model may be obtained (e.g., by one or more data processing systems of a deployment). The first deployment-specific trained inference model may be a deployment-specific trained incident model.

In operation 304, and as discussed above in reference to FIGS. 2B and 2C, a second deployment-specific trained inference model may be obtained (e.g., by one or more data processing systems of the deployment). The second deployment-specific trained inference model may be a deployment-specific trained fix model.

In operation 306, the first deployment-specific trained inference model and the second deployment-specific trained inference model in a storage (of the one or more data processing systems of the deployment) to be hosted by and made available for use to the one or more data processing systems of the deployment.

The process of FIG. 3A may end following operation 306.

Turning now to FIG. 3B, after the deployment is now provided with the first deployment-specific trained inference model and the second deployment-specific trained inference model, in operation 312 and as discussed above in reference to FIG. 2D, an occurrence of a trigger event may be determined (e.g., detected) by a data processing system of the deployment.

In embodiments, the trigger event may be associated with an incident associated with the data processing system that determined the occurrence of the trigger event.

In operation 314 and as discussed above in reference to FIG. 2D, a user action implication report may be generated in response to the determination in operation 312. In embodiments, the user action implication report may be generated using the trigger event along with the first deployment-specific trained inference model and the second deployment-specific trained inference model.

For example, assume that the trigger event indicates that a user of the data processing system is about to perform action ABC to resolve the incident. Using this action ABC and the current conditions of the data processing system, the first deployment-specific trained inference model (e.g., the incident model) may output what could happen as a result of (e.g., an implication of) actual performance of action ABC. Using the current conditions of the data processing system, the second deployment-specific trained inference model (e.g., the fix model) may output potential temporary and/or permanent fixes for the incident.

Additionally, the second deployment-specific trained inference model (e.g., the fix model) may also use information regarding action ABC, the current conditions of the data processing system, and the implication output by the incident model to output potential temporary and/or permanent fixes to resolve the implication (assuming that action ABC was actually performed to show the user if any fixes are even possible after further complications have occurred as a result of actual performance of action ABC).

In embodiments, the user action implication report may include one or more actions that can be taken by (e.g., by the user or by the data processing device) to resolve the incident and one or more implications associated with each of the one or more actions. Each of the one or more implications specifies what would happen to the data processing system should each of the one or more actions actually be executed. Each of the implications may be a negative implication (specifying that further complications to the data processing system may occur that could cause (e.g., render) the data processing system to become completely unusable) or a positive implication (specifying that the incident could be effectively resolved).

In operation 316, the generated user action implication report may be provided to a user of the data processing system (e.g., via a display of the data processing system). In embodiments, the user action implication report may be provided to the user to prevent execution, by the user and in response to an attempt by the user to resolve the incident (determined in operation 312), of an action among the one or more actions (included in the user action implication report) associated with a negative one of the one or more implications to the data processing system.

The process of FIG. 3B may end following operation 316.

Turning to FIG. 3C, in operation 322 and as discussed above in reference to FIGS. 2D and 2C, the data processing system may perform one or more action sets (included any of the suggested/recommend fixes included in the user action implication report) to resolve any determined incidents to obtain an incident resolved data processing system.

In operation 324, and as discussed above in reference to FIGS. 2D and 2C, the data processing system may provide information regarding the one or more action set to the data processing system manager to inform the data processing system manager about any changes (e.g., in hardware or software) to the data processing system.

In operation 324 and as discussed above in reference to FIGS. 2D and 2C, in response to providing the data processing system manager with information about the changes to the data processing system, the data processing system may obtain an updated one of the first deployment-specific trained inference model and an updated one of the second deployment-specific trained inference model that are each further trained and/or customized using the information regarding the changes to the data processing system (e.g., the changes as a result of the performance of the one or more action sets).

The process of FIG. 3C may end following operation 326.

Figure 4:
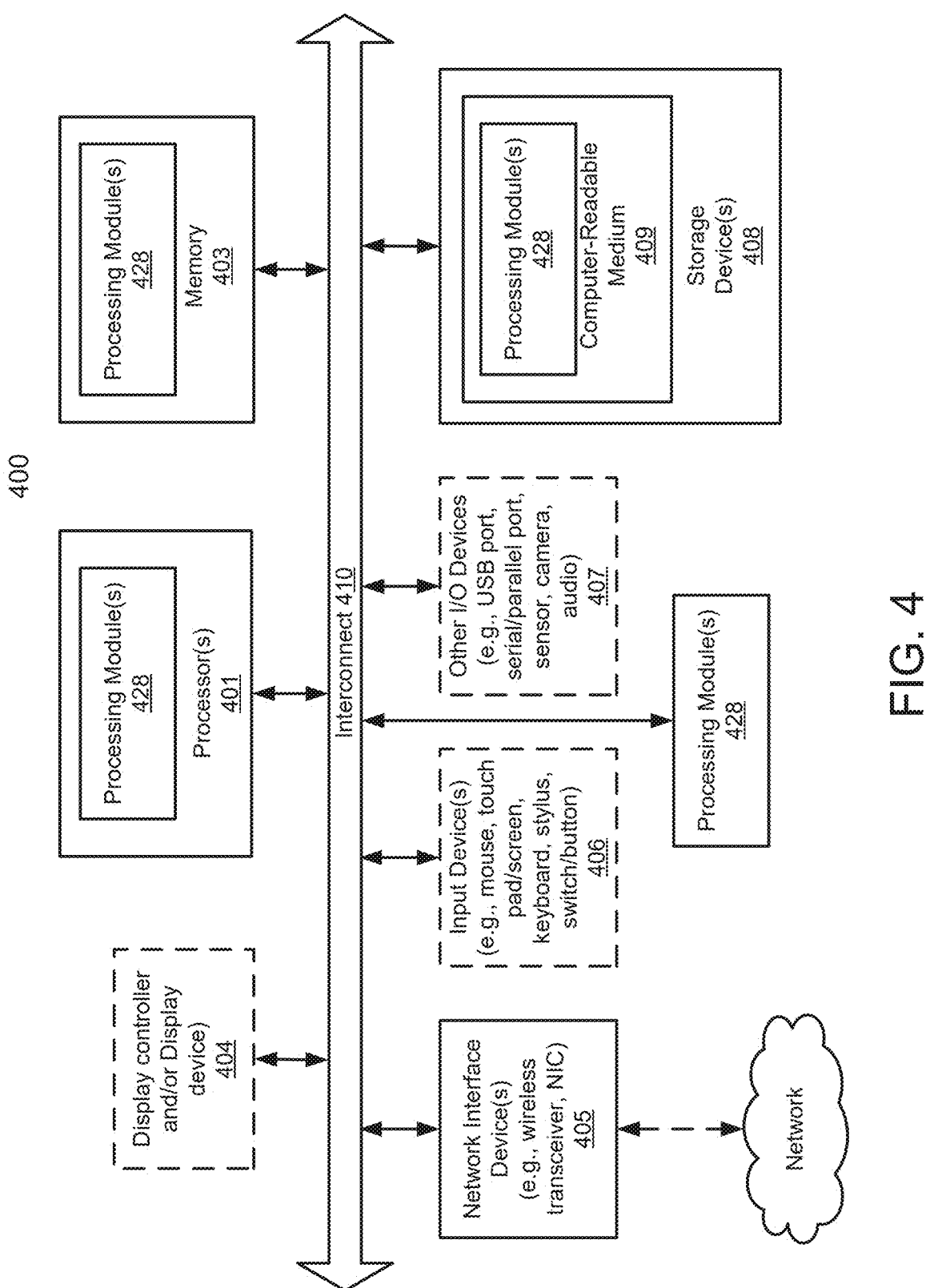
FIG. 4 shows a block diagram illustrating a computing device in accordance with one or more embodiments.

Any of the components illustrated in FIGS. 1-3C may be implemented with one or more computing devices. Turning to FIG. 4, a block diagram illustrating an example of a computing device (also referred to herein as "system 400")

in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system, the method comprising:

determining occurrence of one or more trigger events, the one or more trigger events being associated with an incident associated with the data processing system;

generating, in response to the determination, a user action implication report, the user action implication report comprising one or more actions that can be taken by the user to resolve the incident and one or more implications associated with each of the one or more actions, each of the one or more implications specifying what would happen to the data processing system should a user execute each of the one or more actions, wherein the one or more trigger events comprise a detection, by the data processing system and before the user action implication report is generated, that the user is about to perform at least one of the one or more actions; and providing the user action implication report to the user of the data processing system to prevent execution, by the user and in response to an attempt by the user to resolve the incident, of an action among the one or more actions associated with a negative one of the one or more implications to the data processing system.

2. The method of claim 1, wherein performance of the action among the one or more actions associated with the negative one of the one or more implications renders the data processing system unusable to the user.

3. The method of claim 1, wherein the data processing system is part of a deployment, and wherein before the occurrence of the one or more trigger events, the method further comprises:

obtaining, from a data processing system manager:

a first deployment-specific trained inference model for the deployment, the first deployment-specific trained inference model being trained to predict the one or more implications, and a second deployment-specific trained inference model for the deployment, the second deployment-specific trained inference model being trained to output suggested resolutions for avoiding the one or more implications.

4. The method of claim 3, wherein the user action implication report is generated using the first deployment-specific trained inference model and the second deployment-specific trained inference model.

5. The method of claim 3, wherein the detection is performed in real time as the user is in the process of performing the at least one of the one or more actions.

6. The method of claim 3, wherein the detection is in response to obtaining the one or more actions as a proposed plan of action from the user.

7. The method of claim 4, wherein the one or more trigger events further comprise a prediction by the data processing system, using the first deployment-specific trained inference model, that the incident will occur at a future point in time.

8. The method of claim 7, wherein the first deployment-specific trained inference model is further trained to generate the prediction.

9. The method of claim 3, wherein the method further comprising:

after providing the user implication action report to the user, performing one or more action sets to obtain an incident resolved data processing system;

providing information regarding the one or more action sets to the data processing system manager; and obtaining an updated one of the first deployment-specific trained inference model and an updated one of the second deployment-specific trained inference model that are each further trained using the information regarding the one or more action sets.

10. A non-transitory machine-readable medium having instructions stored therein, which when executed by a processor, cause the processor to perform operations for managing a data processing system, the operations comprising:

determining occurrence of one or more trigger events, the one or more trigger events being associated with an incident associated with the data processing system;

generating, in response to the determination, a user action implication report, the user action implication report comprising one or more actions that can be taken by the user to resolve the incident and one or more implications associated with each of the one or more actions, each of the one or more implications specifying what would happen to the data processing system should a user execute each of the one or more actions, wherein the one or more trigger events comprise a detection, by the data processing system and before the user action implication report is generated, that the user is about to perform at least one of the one or more actions; and providing the user action implication report to the user of the data processing system to prevent execution, by the user and in response to an attempt by the user to resolve the incident, of an action among the one or more actions associated with a negative one of the one or more implications to the data processing system.

11. The non-transitory machine-readable medium of claim 10, wherein performance of the action among the one or more actions associated with the negative one of the one or more implications renders the data processing system unusable to the user.

12. The non-transitory machine-readable medium of claim 10, wherein the data processing system is part of a deployment, and wherein before the occurrence of the one or more trigger events, the operations further comprise:

obtaining, from a data processing system manager:

a first deployment-specific trained inference model for the deployment, the first deployment-specific trained inference model being trained to predict the one or more implications, and a second deployment-specific trained inference model for the deployment, the second deployment-specific trained inference model being trained to output suggested resolutions for avoiding the one or more implications.

13. The non-transitory machine-readable medium of claim 12, wherein the user action implication report is generated using the first deployment-specific trained inference model and the second deployment-specific trained inference model.

14. A data processing system, comprising:

a processor; and a memory coupled to the processor to store instructions, which when executed by the processor, cause the processor to perform operations for managing a data processing system, the operations comprising:

determining occurrence of one or more trigger events, the one or more trigger events being associated with an incident associated with the data processing system;

generating, in response to the determination, a user action implication report, the user action implication report comprising one or more actions that can be taken by the user to resolve the incident and one or more implications associated with each of the one or more actions, each of the one or more implications specifying what would happen to the data processing system should a user execute each of the one or more actions, wherein the one or more trigger events comprise a detection, by the data processing system and before the user action implication report is generated, that the user is about to perform at least one of the one or more actions; and providing the user action implication report to the user of the data processing system to prevent execution, by the user and in response to an attempt by the user to resolve the incident, of an action among the one or more actions associated with a negative one of the one or more implications to the data processing system.

15. The data processing system of claim 14, wherein performance of the action among the one or more actions associated with the negative one of the one or more implications renders the data processing system unusable to the user.

16. The data processing system of claim 14,
wherein the data processing system is part of a deployment, and
wherein before the occurrence of the one or more trigger events, the operations further comprise:
obtaining, from a data processing system manager:
a first deployment-specific trained inference model for the deployment, the first deployment-specific trained inference model being trained to predict the one or more implications, and
a second deployment-specific trained inference model for the deployment, the second deployment-specific trained inference model being trained to output suggested resolutions for avoiding the one or more implications.

17. The data processing system of claim 16, wherein the user action implication report is generated using the first deployment-specific trained inference model and the second deployment-specific trained inference model.

18. The non-transitory machine-readable medium of claim 13, wherein the one or more trigger events further comprise a prediction by the data processing system, using the first deployment-specific trained inference model, that the incident will occur at a future point in time.

19. The non-transitory machine-readable medium of claim 18, wherein the first deployment-specific trained inference model is further trained to generate the prediction.

20. The data processing system of claim 17, wherein the one or more trigger events further comprise a prediction by the data processing system, using the first deployment-specific trained inference model, that the incident will occur at a future point in time.

* * * * *